United States Patent [19]

Reuting

[11] 4,125,887

[45] Nov. 14, 1978

[54] SOCKET AND RELAY ASSEMBLY

[75] Inventor: Hans W. Reuting, Peine, Fed. Rep. of Germany

[73] Assignee: Elmeg Elektro-Mechnik GmbH, Peine, Fed. Rep. of Germany

[21] Appl. No.: 664,972

[22] Filed: Mar. 8, 1976

[30] Foreign Application Priority Data

Mar. 8, 1975 [DE] Fed. Rep. of Germany ....... 2510167

[51] Int. Cl.[2] .............................................. H02B 1/04

[52] U.S. Cl. .................................... 361/331; 361/357; 361/394; 335/132; 200/307

[58] Field of Search ................... 317/99, 101 CP, 112, 317/113; 200/303, 307, 51 R; 335/83, 86, 132, 133, 135, 136, 184, 202; 339/17 C, 17 CF; 248/DIG. 9; 29/413; 361/334, 393, 394, 417, 419, 331, 332, 420

[56] References Cited

U.S. PATENT DOCUMENTS

| | | | |
|---|---|---|---|
| 2,878,336 | 3/1959 | Ehrlich | 200/303 |
| 3,159,365 | 12/1964 | Watson | 200/307 |
| 3,188,404 | 6/1965 | Fichter | 200/307 |
| 3,200,208 | 8/1965 | Mastney | 200/307 |
| 3,211,854 | 10/1965 | Bengtsson | 335/202 |
| 3,286,070 | 11/1966 | Volker | 200/303 |
| 3,559,802 | 2/1971 | Eidus | 29/413 |
| 3,559,855 | 2/1971 | Barnett | 29/413 |
| 3,655,925 | 4/1972 | Lincoln | 200/307 |
| 3,808,506 | 4/1974 | Lang | 361/394 |
| 3,921,107 | 11/1975 | Reuting | 335/136 |

*Primary Examiner*—Gerald P. Tolin
*Attorney, Agent, or Firm*—Smyth, Pavitt, Siegemund, Jones & Martella

[57] ABSTRACT

Plural relays are stacked in chute-like, tubular socket frames with rectangular cross-section. Contact springs are arranged in several levels and continued through the frame wall for termination externally accessible contact pins. The frames may be integral, partitionable in the several levels or lengthwise partitionable.

14 Claims, 4 Drawing Figures

SOCKET AND RELAY ASSEMBLY

BACKGROUND OF THE INVENTION

The present invention relates to socket structure for electromagnetic relays and more particularly the invention relates to multi-relay assemblies.

Electromagnetic relays are known which have, for example, a pair of quadrilateral yokes, and permanent magnets are interposed to serve as spacer and to provide magnetic bias. The central space including the openings in each yoke is used as mounting space for the relay coil, and the armature extends into the available spaces between aligned legs of the two yokes. The contacts are likewise disposed in the latter spaces. These relay contacts in turn are connected to contacts which are externally accessible in suitable places, for example, right at additional corner spacers for the two yokes. A relay of this type, for example, disclosed in U.S. Pat. No. 3,921,107 and others. This relay is of compact construction and quite powerful inspite of its small overall size and dimensions.

In my patent, U.S. Pat. No. 3,949,276, issued Apr. 6, 1976, I have suggested particular plug-in structure for such a relay, using a socket which circumcribes the relay at its small sides. Circuits and equipment employing many relays usually require easy exchange of the relays. My plug-in socket is very suitable here; however, for larger units and systems a still more compact design is desirable, without, however, eliminating the easy access and assembly of my relay-with-socket construction.

DESCRIPTION OF THE INVENTION

It is an object of the present invention to provide for a compact multi-relay assembly which permits installation of plural relays as a group.

It is a specific object of the present invention to extend the socket-realy construction of my earlier application to multi-relay assemblies.

It is another object of the present invention to provide for multi-relay mounting in a manner facilitating compact mounting to printed circuit boards.

In accordance with the preferred embodiment of the present invention, it is suggested to provide a tubular frame as a socket, which frame has internal cross-sectional contour matching the outer contour of the plural relays to be stacked in the frame and in a plurality of levels. Spring contacts are arranged to extend inwardly from the frame wall for making contact with externally assessible contacts of each relay. These spring contacts are continued through the frame wall or walls to become externally accessible, either as laterally outwardly extending contact pins or as extensions which run along (or in) the outer frame walls for projection beyond one end of the tubular frame. In either case, these contact pins or extensions extend, at least in groups, into common planes, into which one can place printed circuit boards for establishing the necessary connections. The contact pins or extensions will be regularly soldered to the P.C. boards.

The socket frame may be of integral construction, and conceivably score lines are provided to break off or cut unwanted sections if a smaller numer of relays is to be stacked. Alternatively, the frame may be sectionized either laterally along the dividing planes of the several stacking levels; or lengthwise to obtain simply constructed single frame wall pieces or elements; or both. In either case the sections, pieces or elements are clamped together to assemble the complete frame.

The partitioning along the line of the levels has the advantage that a few sections with capacities for, say, one, two and five relays will accommodate a large variety in the number of relays to be stacked and mounted. The lengthwise partitioning facilitates the soldering of the laterally extending connector pins to printed circuit boards, as each frame wall section is soldered to but one flat board. Both modes of partitioning combine the advantages of small inventory with simple PC board mounting techniques.

The springs engaging the inserted relays may hold them also physically. However, strapping the assembly around the open ends of the frame may be safer. An inserted lift band or recesses for manual access may be used for taking the relays out of the socket frame.

The individual relays may be directly stacked whereby, however, the respective magnetic axes of juxtaposed relays should extend transversely to each other. In lieu thereof or additionally, one may interpose non-magnetic shieldings or just spacers to increase the air gap between the different relays.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
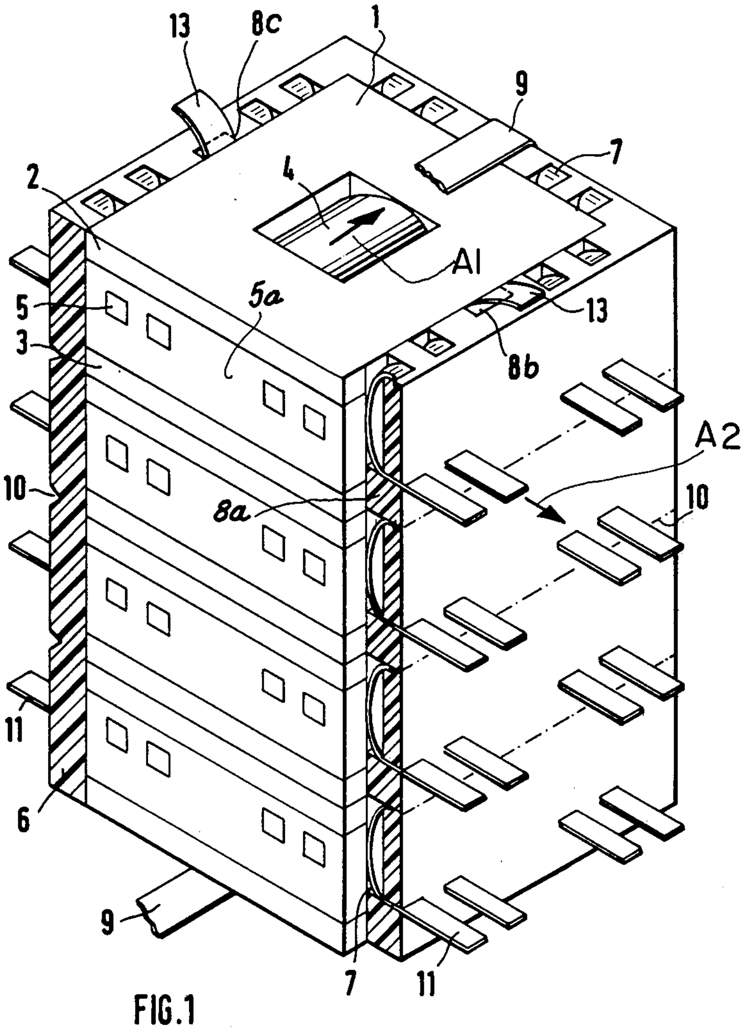
FIG. 1 is an isometric view, partially cut open of a socket frame for four relays and constructed in accordance with the preferred embodiment of the present invention.

Proceeding now to the detailed description of the drawings, each of the figures includes two or more relays 1, each of which having an upper yoke 2 and a lower yoke 3. These yokes are of flat, quadrilateral construction with a central quadrilateral opening. This opening is occupied by the relay coil 4 as well as the core(not shown). The yokes are constructed to have four, flat, similarly wide legs. Each relay thus has overall configuration of a flat parallelepiped with 90° angles between the different, nonparallel sides; i.e. they are flat prisms with rectangular sides. Conceivably, but not necessarily, the top and bottom of each flat relay is of square-shaped configuration.

The yokes 2 and 3 are spaced-apart by spacer constructions, such as *5a* made of electrically (and magnetically) insulating material and penetrated by contacts 5. Some of these contacts 5 lead to the relay contacts in the interior of the relay, other contacts lead to the energizing coil 4. For purposes of this invention no specific assignment of function in this regard is necessary as far as construction is concerned.

Turning now to further particulars of the drawings, FIG. 1 shows a tubular socket frame 6 of quadrilateral cross-section (preferably rectangular or even square-shaped) and having elongated extension or height in the direction transverse to any quadrilateral section plane. The socket accommodates a stack of four relays, which are simply placed one on top of the other. The outer contour of the relays matches the inner contour of the tubular socket frame. The relays are stacked so that the magnetic axes, such as A1 and A2 of juxtaposed relays, extend transversely to each other. The interior walls of the socket are provided with narrow, elongated grooves 8 established in four levels, each level being separated by an ungrooved wall portion, such as 8*a*. Each groove 8 receives a contact spring 7, having one end crimped and inserted into a retaining slot. The major portion of the spring is flexed inwardly (as to socket 6), which is outwardly in relation to the respective groove 8. This outwardly curved portion of a spring makes contact with one of the contacts 5 of an inserted relay. The relationship is quite analogous to the single relay socket and contact making as disclosed in my copending application. The other end of the spring is run through a slit in the socket wall and extends outwardly as a flat contact pin 11. That contact pin may be strengthened by flat soldering vanes.

The contact pin 11 extend, in effect, in four groups from the four frame walls and in lateral, outward direction of each such wall. Thus, each of the four groups of contact pins extend towards a common plane. One may place a printed circuit board into that plane, the board being provided with suitable openings to be traversed by the pins which ectend from the same frame wall. One will need, therefore, four P.C. boards (though wire connections may conceivably replace any board) on which are, for example, provided interconnect patterns as the relays may well have mutually cooperative relation (which may be the reason for mounting them together to begin with). Thus, the particular socket frame permits a very organized way of mounting and/or connecting the relay stack.

In addition to grooves 8, the four inner walls of the socket have grooves 8*b*, 8*c*, each of which running for the length of the socket. These grooves receive a ribbon 13 which runs down in groove 8*b*, extends across the bottom of the lowest relay and up again in groove 8*c*. This way one can lift the entire stack of relays out of the socket by means of this lifting ribbon 13.

The individual relays are placed in the socket individually, for example, from the open top end of the tubular frame 6, the ribbon 13 having been put in place earlier. In order to avoid magnetic interaction, the relays are placed so that their respective coil axes are 90° out of phase (physically). The contact springs 7 do not just make contact, but hold the respective relay physically. That may not be sufficient, particularly if the socket with inserted relays is turned upside down for any reason. Thus, it is advisable to loop stack and socket with a strap 9 which runs across top and bottom opening of the socket, preferably transversely to ribbon 13 at the bottom opening of the tubular frame.

It can readily be seen that socket 6 may be a section of a longer tube. Score lines, such as 10 may be provided in the particular planes in which two stacked relays interface separating the several stacking levels of and in the socket frame. If a shorter socket is desired, one may simply brake or cut the unnecessary portion off. Thus, this particular example showing four relays is representative only of purposes of explaining the invention; the number of relays, i.e. the length of the socket is basically arbitrary.

Figure 2:
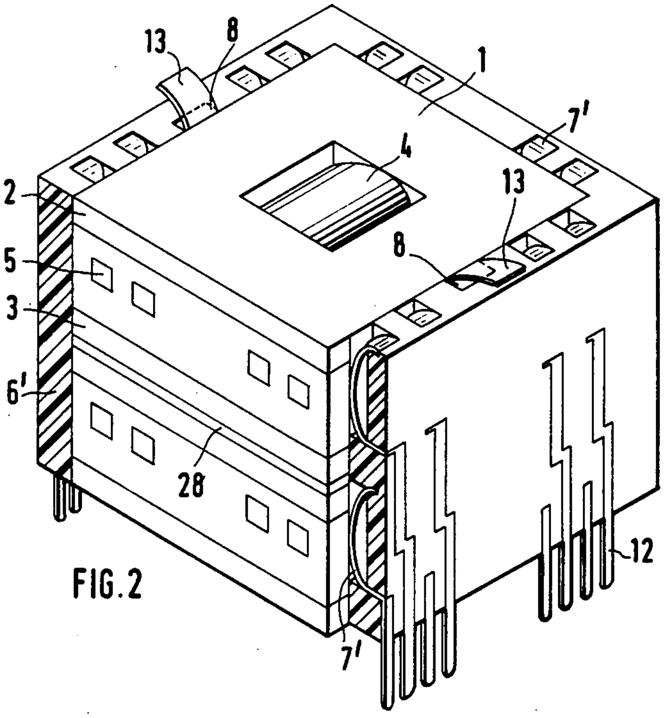
FIG. 2 is a similar type view of a socket frame for two relays still in accordance with the preferred embodiment.

FIG. 2 shows a variant of the preferred embodiment differing from the socket frame of FIG. 1 by the configuration of the contacts. The several contact springs 7′ are externally continued in flat contacts which run parallel to the outer surface of the socket and extend in socket connector pins 12 which in turn extend down from the bottom plane of the socket. It is quite apparent that the stack and socket height is limited here. More than two relays are difficult to accommodate. Otherwise the construction is quite the same including the lift ribbon 13.

This particular construction for a socket frame 6′ has, however, the advantage that a common printed circuit board can be soldered to all of the contact pins 12 of the stack and frame. One can, of course, mount plural such two-relay sockets on a common larger printed circuit board.

This example shows also a supplement which is by no means tied to this particular socket, but could also be used in the socket frame shown in FIG. 1. The two relays stacked in this particular socket 6′ are separated by a magnetic shield 28. A somewhat lesser degree of decoupling is obtained if one places spacers between the stacked relays to enlarge the air gap. Of course, this kind of spacing requires a slightly larger socket in either case.

Figure 3:
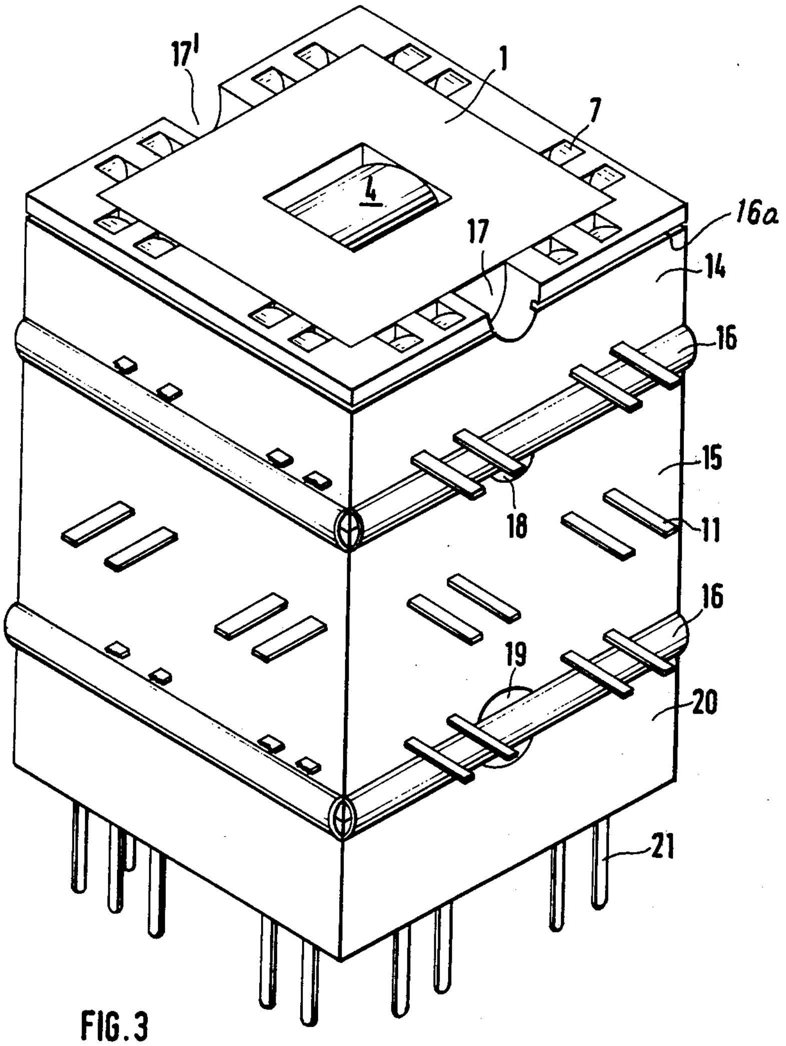
FIG. 3 is an isometric view of a compound or multisection socket.

The example shown in FIG. 3 has a socket which is the composite of plural socket elements or sections, which are combined in building block fashion. Quite arbitrarily the figure shows a single relay socket 14 combined with a two relay socket 15. It was found that one should also have available a socket of similar construction but with a capacity of five relays. This way a large variety of relay stacks can readily be accommodated, and inventory is limited to just three types of sockets. The principle employed here is a partitioning of the socket frame in dividing planes of respective two different levels in a larger stack and frame.

Thus, FIG. 3 shows a three-relay stack accommodated by a single relay and a two-relay socket. These two sockets 14 and 15 are interlocked by means of the resilient half-tubes or semi-cylindrically curved clamp sheets 16. They are slightly spread and inserted in grooves, such as 16*a* along the tops and bottoms of each socket section upon being released. These clamps 16 hold the juxtaposed socket sections together.

FIG. 3 shows also a different construction feature relates to the removal of the relays. The simple, single relay socket has a pair of recesses 17, 17′ which face each other across the socket interior. These recesses are provided for insertion of fingers, so that the relay can be gripped and removed manually. The two-relay socket 15 has such recesses 18 and 19 respectively on top and bottom to remove the two relays through the opposite end openings of the socket frame. The five relay sockets (not shown) should be provided with the lifting ribbon, such as 13 of FIG. 1.

Due to the relatively large number of sockets stacked, the type of contact pins denoted by reference numeral 11 and explained with reference to FIG. 1 must be used. However, it may be of advantage to use still another type of socket 20, preferably of the single relay type, where the pins 21 extend down from the bottom of the socket. The laterally extending contact pins 11 may be connected to printed circuit boards as before, and a still further board may be provided across bottom socket 20. It will be understood that the use of this bottom-pin type socket section 20 will depend on the mounting space and requirement. One does need a still further PC board for mounting, but in cases plural small boards may be more desirable on the other hand, the bottom socket pins are shwon to be recessed. Thus, if a PC is used to connect to the pins of this section 20, the same board can be used to receive termination pins, which extend from PC boards, which are connected to the side walls of the frame. This way, a rather simple way for further connecting all four side wall PC boards is readily provided.

Figure 4:
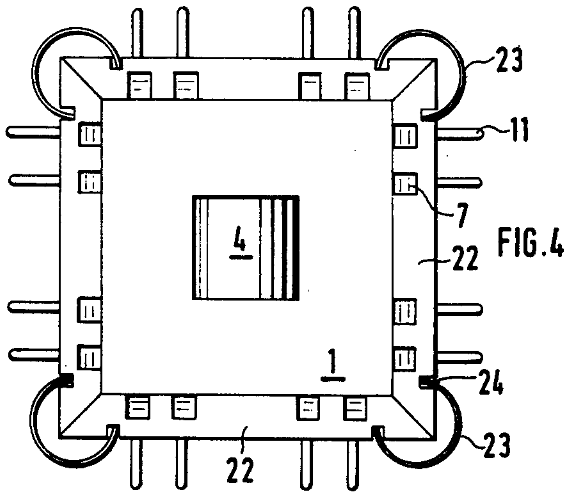
FIG. 4 is a top elevation of a socket frame with lengthwise partitioning.

The socket of FIG. 4 is actually a variation of any of the sockets described earlier except that laterally extending contact pins 11 have been chosen for the representation. This specific example illustrates the lengthwise partitioning of a socket frame. Accordingly, the socket frame (of any length) is constructed from four plane plates 22 having bevelled edges. These plates have longitudinal grooves 24 adjacent to the edges. Clamps 23 of three-quarter tube-like contour are slipped into the grooves of respective two plates having been placed in abutment with their bevelled edges and four such clamps 23 hold a complete socket together.

If one uses the laterally extending contact pins as illustrated, it was found practical to plug each socket plate first into the respective printed circuit board and solder the pins to the PC board. The socket plates with PC boards are then assembled to a socket frame into which the relays are stacked as described.

It can readily be seen that the principle of partitioning the frame stack in accordance with individual and plural levels (FIG. 3) and the lengthwise partitioning to obtain plane frame walls (FIG. 4) can be combined which is advantageous for manufacturing assembly and inventory.

The invention is not limited to the embodiments described above, but all changes and modifications thereof not constituting departures from the spirit and scope of the invention are intended to be included.

I claim:

1. A multi-relay assembly comprising:

a socket constructed as a tubular frame having particular cross-section contour, being open at one end and having a height for accommodating a plurality of relays in different levels;

a plurality of contact springs extending inwardly from the frame and continued outwardly from the frame for external accessibility, the plurality of springs being arranged in several levels in the frame; and a plurality of relays equal in number to the number of levels in the frame and being stacked in the frame, one relay per level, each relay having contour matching the cross-sectional contour of said frame and having a particular height, the relays having laterally extending contacts being in engagement with said inwardly extending contact springs, the height of the socket being an integral multiple of the height of the relays, said tubular frame being so dimensioned to permit the insertion and stacking of said relays through said open end.

2. A multi-relay assembly as in claim 1, wherein said socket frame is an integral element.

3. A multi-relay assembly as in claim 2, said frame being provided with score lines for separating individual socket frame sections from said frame.

4. A multi-relay assembly as in claim 1, the frame being partitioned into several sections, each for at least one relay, and including means for locking the sections together.

5. A multi-relay assembly as in claim 4, the springs of one of the sections extending outwardly away from the end opening of the frame, the springs from the other sections having outward extension, extending laterally away from the frame.

6. A Multi-relay assembly as in claim 1, said frame being longitudinally divided into wall sections and means for clamping the wall sections together.

7. A multi-relay assembly as in claim 1, said outward extensions of the springs being contact pins, a least some of them extending laterally away from the frame.

8. A multiple assembly as in claim 1 at least some of said outward extensions of the springs extending along the outer surface of the frame, towards and beyond one open end of the frame.

9. A multi-relay assembly as in claim 1 and including a strap extending across the open ends of the frame and holding the relays therein.

10. A multi-relay assembly as in claim 1, including longitudinal grooves in the frame, facing each other across the interior of the frame and receiving a lift ribbon which extends in the grooves as well as across one open end of the frame.

11. A multi-relay assembly as in claim 1 and including magnetic shield means between the relays in the frame.

12. A multi-relay assembly as in claim 1, wherein each of the relays has a magnetic axis juxtaposed relays in the stack being physically arranged so that their magnetic axes extend transversely to each other.

13. A multi-relay assembly as in claim 6, wherein grooves are provided along edges of adjoining wall sections, the means for clamping including three quarter tube-like springs, having edges inserted into said grooves.

14. A multi-relay assembly as in claim 4, wherein grooves are provided along edges of adjoining sections, the means for locking including semi-cylindrical clamp sheets having its edges inserted into said grooves.

* * * * *